United States Patent
Montague et al.

[11] Patent Number: 6,153,697
[45] Date of Patent: Nov. 28, 2000

[54] FLUOROPOLYMERS AND COATING COMPOSITIONS

[75] Inventors: Robert A. Montague; Edward E. McEntire, both of Allison Park, Pa.

[73] Assignee: PPG Industries Ohio, Inc., Cleveland, Ohio

[21] Appl. No.: 09/272,011

[22] Filed: Mar. 18, 1999

Related U.S. Application Data

[60] Provisional application No. 60/078,457, Mar. 18, 1998.

[51] Int. Cl.⁷ .................... C09D 127/12; C09D 135/02
[52] U.S. Cl. .................. 525/123; 525/124; 525/129; 525/160; 525/162; 525/326.3
[58] Field of Search ................... 525/123, 124, 525/129, 160, 326.3

[56] References Cited

U.S. PATENT DOCUMENTS

| | | | |
|---|---|---|---|
| 3,380,971 | 4/1968 | Chalmers et al. | 260/78.5 |
| 4,345,057 | 8/1982 | Yamabe et al. | 526/247 |
| 4,851,479 | 7/1989 | Blaise et al. | 525/276 |
| 4,857,620 | 8/1989 | McCollum et al. | 526/255 |
| 4,946,913 | 8/1990 | Kappler | 526/87 |
| 5,037,922 | 8/1991 | Kappler et al. | 526/249 |
| 5,079,320 | 1/1992 | Kappler et al. | 526/249 |
| 5,082,911 | 1/1992 | Kappler et al. | 526/249 |
| 5,169,915 | 12/1992 | Mohri et al. | 526/247 |
| 5,216,081 | 6/1993 | Mohri et al. | 525/199 |
| 5,612,416 | 3/1997 | McCollum et al. | 525/123 |

FOREIGN PATENT DOCUMENTS

| | | |
|---|---|---|
| 301 557 | 7/1988 | European Pat. Off. . |
| 0 743 347 A2 | 11/1996 | European Pat. Off. . |
| 01287129 | 11/1989 | Japan . |
| 93/06170 | 4/1993 | WIPO . |

OTHER PUBLICATIONS

J. Macromol, Sci–Chem., A4 (4), pp. 801–813, Jul., 1970, Radiation–Induced Copolymerization of Fluorine–Containing Monomers.

Kenkichi Ishiguro, et al. Fluorine–19 Nuclear Magnetic Resonance of Chlorotrifluoroethylene–Propylene Alternating Copolymer, vol. 8, No. 2, Mar.–Apr. 1975, pp. 177–181.

*Primary Examiner*—Patricia A. Short
*Attorney, Agent, or Firm*—Paul S. Chirgott; Deborah M. Altman

[57] ABSTRACT

The present invention pertains to durable, chemically-resistant films made from terpolymers. These terpolymers include repeating units of a fluorinated unsaturated monomer, a diester of an unsaturated anhydride with at least one hydroxyl group, and an olefin. The novel films result from curing a coating composition which include: (a) a polymeric component which includes the terpolymers described above, and (b) a crosslinking component. The films of the present invention have many of the excellent physical properties typically associated with those derived from hydroxy-functional fluoropolymers.

13 Claims, No Drawings

FLUOROPOLYMERS AND COATING COMPOSITIONS

This application claims the benefit of priority of Provisional Application Serial No. 60/078,457, filed Mar. 18, 1998 entitled Novel Fluoropolymers And Coating Compositions.

FIELD OF THE INVENTION

This invention pertains to durable, chemically-resistant films made from terpolymers derived from fluoromonomers, olefins, diesters of unsaturated anhydrides wherein at least one of the esterfying groups includes a hydroxyl group. The films of the present invention have many of the excellent physical properties typically associated with those derived from hydroxy-functional fluoropolymers.

BACKGROUND OF THE INVENTION

Hydroxy-functional fluoropolymers useful in coating compositions are known in the art. For example, U.S. Pat. No. 4,345,057, assigned to Asahi Glass Company, details the synthesis of fluorinated ethylene-(hydroxy-alkyl) vinyl ether (FEVE) copolymers and their application in thermoset coating compositions. Such coatings are useful in forming high gloss, durable topcoats for building panels, automotive body panels and automotive body parts.

Notwithstanding their excellent properties, the use of hydroxy-functional vinyl ethers as the source of the reactable hydroxyl group in these fluoropolymers provides a coating polymer that is relatively expensive. While the good durability of these FEVE coatings is well-known in the coatings industry, there is a need for a more cost-effective fluoropolymer that can provide similar properties.

Co-pending and commonly-owned U.S. patent application Ser. No. 08/541,748, now U.S. Pat. No. 5,750,770, and commonly-owned U.S. Pat. No. 5,612,416 both disclose the synthesis and use in coating compositions of copolymers which comprise alternating units of a vinyl monomer and a diester of an unsaturated anhydride in which at least one of the esterifying groups includes a hydroxyl group. The commonly-owned application and patent also disclose the synthesis and use in coating compositions of terpolymers which comprise alternating units of hydroxyalkyl maleates, vinyl monomers and fluoromonomers.

SUMMARY OF THE INVENTION

One object of this invention is to provide cost-efficient coating compositions that have many of the highly desirable properties of those derived from hydroxy-functional fluoropolymers.

The present invention pertains to durable, chemically-resistant films made from terpolymers. These terpolymers comprise repeating units of a fluorinated unsaturated monomer, a diester of an unsaturated anhydride with at least one hydroxyl group, and an olefin. The novel films result from curing a coating composition which comprises: (a) a polymeric component which comprises the terpolymers described above, and (b) a crosslinking component.

DETAILED DESCRIPTION

The polymeric component of the coating compositions prepared in accordance with this invention comprises terpolymers which have repeating units of a fluorinated unsaturated monomer, a hydroxy-functional diester of an unsaturated anhydride, and an olefin.

The fluorinated unsaturated monomer employed when making the terpolymers used when practicing this invention can be any suitable fluorinated unsaturated monomer. The suitability of using a particular fluorinated unsaturated monomer will be apparent to those skilled in the art after reading this specification.

Examples of particularly suitable fluorinated unsaturated monomers include fluorinated ethylene compounds such as chlorotrifluoroethylene (CTFE), vinylidene fluoride, vinyl fluoride, and tetrafluoroethylene. Additionally, fluorinated derivatives of unsaturated acids and anhydrides, fluorinated vinyl monomers, fluorinated acrylics, or fluorinated olefins can also be employed as the source of fluorinated unsaturated monomers.

The hydroxy-functional diester of an unsaturated anhydride employed when making the terpolymers used when practicing this invention can be any suitable hydroxy-functional diester. The suitability of using a particular hydroxy-functional diester will be apparent to those skilled in the art after reading this specification.

Examples of particularly suitable hydroxy-functional diesters of an unsaturated anhydride include those disclosed in commonly-owned U.S. Pat. No. 5,612,416, the relevant parts of which are incorporated herein by reference. These hydroxy-functional diesters may, optionally, include a bis-hydroxy functional diester of an unsaturated anhydride. Moreover, the unsaturated anhydride may include maleic anhydride. Also, the diesters of fumaric acid may be utilized when making the terpolymers employed when practicing this invention.

The olefin employed when making the terpolymers used when practicing this invention can be any suitable olefin. The suitability of using a particular olefin will be apparent to those skilled in the art after reading this specification.

Examples of particularly suitable olefins include alpha-olefins such as propylene, isobutylene, diisobutylene, 1-hexene, 1-octene, 1-decene, and mixtures thereof. Other olefins which can be employed include ethylene and cyclic olefins.

The terpolymers used when practicing this invention can be prepared by any suitable means. The suitability of preparing a terpolymer which can be used when practicing this invention will be apparent to those skilled in the art after reading this specification. Typically, the terpolymers are prepared at elevated pressure in an autoclave reactor.

One example of a specific procedure used to prepare suitable terpolymers which can be employed is as follows: First, a suitable solvent (e.g., an aromatic hydrocarbon) is added to an autoclave reactor. The reactor is then purged with dry nitrogen, and a partial vacuum is established. The fluorinated monomer, olefin, and hydroxyl-functional diester of an unsaturated anhydride are partially added to the reactor while agitating the mixture. The reactor is then heated to a temperature of about 100° C. Thereafter, remainder of the three monomers is fully charged at an addition rate over a 2 to 3 hour period and positive pressure is applied. Typically, a suitable polymerization catalyst is also charged into the reactor at this point in time. After these additions, the temperature of about 100° C. is held for about one hour at elevated pressure. The reactor is then cooled to about 25° C., and vented. The polymer product is then transferred to glassware for vacuum-stripping to remove unreacted residual monomer. Following 2 to 3 hours vacuum stripping, the final solids, viscosity, and hydroxyl number are obtained for the polymer product.

The terpolymers employed when practicing this invention typically have a number average molecular weight ranging from about 500 to about 100,000. Preferably, their number average molecular weight ranges from about 750 to about 10,000; and more preferably, from about 1,000 to about 5,000. The aforementioned number average molecular weights are those as measured by gel permeation chromatography (GPC) using polystyrene standards.

The crosslinking component of the coating compositions prepared in accordance with this invention comprises any suitable crosslinking agent. The suitability of using a particular crosslinking agent will be apparent to those skilled in the art after reading this specification.

Examples of particularly suitable crosslinking agents include polyisocyanates, aminoplasts, anhydrides and mixtures thereof. If a polyisocyanate crosslinking agent is employed, it can either be added just before the coating is applied (e.g., as in a two-package coating composition), or incorporated in a one-package coating composition by blocking the isocyanate groups with a suitable blocking agent. Examples of suitable blocking agents include compounds such as an oxime, caprolactam, alcohol, and other compounds with a reactable hydrogen.

Coatings prepared in accordance with the present invention can optionally include an organic solvent component. If present, the organic solvent component comprises any suitable organic solvent or solvent blend. The suitability of using a particular organic solvent will be apparent to those skilled in the art after reading this specification. Examples of particularly suitable organic solvents or solvent blends include aromatic hydrocarbons, and oxygenated solvents such as ketones, esters and glycol-ethers. Mixtures of these solvents may also be used. If such mixtures are employed, it is preferred that a homogeneous solution with the fluorinated terpolymer of the present invention be obtained.

The coatings of the present invention may be clear, opaque or pigmented. Moreover, the coatings may be used as primers, basecoats and/or topcoats.

If the coating composition is to be pigmented, it can include any suitable pigment. The suitability of using a particular pigment will be apparent to those skilled in the art after reading this specification. Example of particularly suitable pigments include inorganic, organic, metallic, metallic-effect, filler and anti-corrosive, and mixtures thereof.

Specific examples of such particularly suitable inorganic pigments include titanium dioxide, iron oxide, lead chromate, chrome green, cadmium sulfide, lithopone pigments, and the like.

Specific examples of such particularly suitable organic pigments include carbon black; monoazo, diazo, and benzimidazolone yellows, oranges, reds, and browns; phthalocyanine blues and greens; anthraquinone pigments ranging from yellow to blue; quinacridone yellows, reds and violets; perylene reds and browns; indigoid reds, blues, and violets; thioindigo violets; isoindolinone yellows, oranges and reds; quinoline yellows, and the like.

Specific examples of such particularly suitable metallic and metallic-effect pigments include aluminum, zinc, lead, bronze, copper, stainless steel and mica flake, and the like.

Specific examples of such particularly suitable filler pigments include magnesium silicate clays, fumed or precipitated silicas, barytes, blanc fixed, china clay, and the like.

Specific examples of such particularly suitable anti-corrosive pigments include lead oxide, zinc chromate, zinc phosphate, micaceous iron oxide, and the like. Mixtures containing any of the pigments described above are also suitable.

Optionally, the coating compositions of the present invention can further include additional compounds such as crosslinking catalysts, pigment wetting and suspension agents, UV light absorbers and stabilizers, anti-oxidants, surface tension (flow) modifiers, rheology modifiers, waxes, gassing inhibitor, corrosion inhibitor, anti-foaming additives, and the like. If employed, these additives are typically present in an amount ranging from about 0.001 percent to about 20 percent by weight, preferably from about 0.01 percent to about 10 percent by weight, and more preferably from about 0.1 to about 5 percent by weight. These weight percentages are based on the weight of the film-forming polymer in the resulting coating composition.

The coating compositions prepared in accordance with the present invention can be applied over any substrates to which they adhere. Examples of suitable substrates include metal, plastic, wood, paper, or masonry surfaces. The coatings can be applied directly onto these substrates, or onto substrates that have first been primed or otherwise treated.

The coating compositions prepared in accordance with the present invention can be applied by any suitable means. Examples of such suitable application means include roller coating, spray coating, flow coating, brushing, dipping, and the like.

EXAMPLES

The following examples illustrate specific embodiments of the present invention. It should be understood, however, that the scope of the invention is not limited to these particular embodiments. A brief description of the examples is as follows:

Example 1 details the synthesis of a soluble terpolymer from a hydroxy-functional diester of maleic anhydride, CTFE, and isobutylene.

Example 2 details the synthesis of a coating composition prepared in accordance with this invention derived from the terpolymer prepared in Example 1.

Example 3 details the synthesis of a terpolymer from the hydroxy-functional maleate, CTFE, and propylene.

Example 4 details the synthesis of a coating composition prepared in accordance with this invention derived from the terpolymer prepared in Example 3.

Example 5 details the synthesis of a control coating composition derived from a commercially available copolymer of CTFE and a hydroxy-vinyl ether (LUMIFLON®).

Example 6 and Example 7 show property comparisons of the coating compositions in Examples 2, 4 and 5.

Example 1

This example details the synthesis of a soluble terpolymer from cyclohexylhydroxypropyl maleate (CHHPM), isobutylene, and CTFE.

To a 4-liter stirred stainless steel autoclave were charged 563 grams of toluene. The reactor was then pressured with nitrogen and depressurized three times. A reduced pressure of −14.50 PSI was established, while adjusting the reactor temperature to 15° C.

The reactor was charged with 151 grams of CTFE, 29 grams isobutylene, and 59 grams of CHHPM, while (a) the agitation on the reactor was set at 400 rpms; (b) the reactor temperature was adjusted to 107° C.; and (c) the internal reactor pressure was adjusted to 2.00 PSI. The reactor was then charged with (a) 482 grams of CTFE at an addition rate of 241 grams/hour, (b) 389 grams of isobutylene at an addition rate of 193 grams/hour, (c) 785 grams CHHPM at an addition rate of 118 grams/hour; and (d) 88.6 ml of LUPERSOL® 575 (t-amyl perocotate) initiator at an addition rate of 44 ml/hour. The following additions were then made to the reactor: (a) 92.4 grams isobutylene at an addition rate of 203 grams/hour, (b)187.6 grams CHHPM at an addition rate of 411 grams/hour, (c) 27.8 ml initiator at an addition rate of 61 ml/hour.

During the monomer additions, the reactor pressure was gradually increased to 157 PSI. The temperature was then maintained at 107° C. for 1 hour at 118 PSI. The reactor was then cooled to 25° C., and vented.

The reaction mixture was transferred to glassware, and heated to 60° C., with vent open. At 60° C., vacuum was slowly applied (vent closed) until full vacuum was achieved. The reaction mixture was vacuum-stripped until the CTFE level was less than 5 PPM, and isobutylene level was less than 20 PPM. The strip procedure was applied for 2½ hours.

The solids of the resulting polymer was determined to be 69 percent by weight (heating 1 gram of the liquid reaction mixture in a vacuum oven at 120° C.). The viscosity of the resulting polymer was determined to be 551 cPs at 25° C. as measured by Brookfield Viscometer (spindle #2 at 30 RPM). Theoretical hydroxyl value of the resulting polymer was determined to be 93 mg KOH/gram of solution.

Example 2

This Example details the synthesis of a coating composition prepared in accordance with this invention derived from the terpolymer prepared in Example 1.

Specifically, 81.4 grams of the polymer product of Example 1 was combined with 57.3 grams of e-caprolactam blocked isocyanurate of hexamethylene diisocyanate (commercially available form BAYER Corporation under the tradename of DESMODUR XP-7018E), 28.6 grams SOLVESSO® 100 (aromatic hydrocarbon solvent), and 1.0 grams of dibutyl tin dilaurate. The resulting coating composition was a clear solution at 60 percent solids by weight (theoretical).

Example 3

This Example details the synthesis of a terpolymer from the hydroxy-functional maleate, chlorotrifluoroethylene, and propylene.

Specifically, a polymerization reaction similar to that of Example 1 was run with the following monomer feeds: (a) CTFE (40 mole %), (b) propylene (50% mole), and (c) CHHPM (10 mole %).

The solids of the resulting polymer was determined to be 70 percent by weight (heating 1 gram of the liquid reaction mixture in a vacuum oven at 120° C.). The viscosity of the resulting polymer was determined to be 4760 CPS at 25° C. as measured by Brookfield Viscometer (spindle #2 at 30 RPM). Theoretical hydroxyl value of the resulting polymer was determined to be 73 mg KOH/gram of solution.

Example 4

This Example details the synthesis of a coating composition prepared in accordance with this invention derived from the terpolymer prepared in Example 3.

Specifically, 90.0 grams of the polymer product of Example 3 was combined with 49.6 grams of BAYER's DESMODUR XP-7018E blocked isocyanate, 28.0 grams SOLVESSO® 100 solvent, and 1.1 grams of dibutyl tin dilaurate. The resulting coating composition was a clear solution at 60 percent solids by weight (theoretical).

Example 5

This Example details the synthesis of a control coating composition derived from a commercially available copolymer of CTFE and a hydroxy-vinyl ether.

Specifically, the comparative coating composition was prepared by combining 187.5 grams of the CTFE/hydroxyvinyl ether copolymer commercially available from Asahi Glass Company under the tradename of LUMIFLON® 502 copolymer; 33.3 grams of BAYER's DESMODUR XP-7018 E blocked isocyanurate; 22.2 grams SOLVESSO® 150 solvent; 8.0 grams cyclohexanone; and 1.0 gram dibutyltin dilaurate. The resulting coating composition was a clear solution at 40 percent solids by weight (theoretical).

Example 6

Coated panels were prepared utilizing the coating compositions from Examples 2, 4, and 5. The panels were prepared by applying thin wet films of the coatings to 0.022 inch thick aluminum panels treated with ALODINE® 1200 pretreatment, with a wire-wound rod. After being coated, the panels were baked for 40 seconds at 264° C. (241° C. peak metal temperature) in a gas-fired oven. The physical properties of the resulting cured films are shown in TABLE 1.

TABLE 1

| Coating | Dry Film Thickness (mils) | Double Rub MEK | E.T. Pencil | Flexibility T-Bend | 60 in-lb. Rev. Impact (R.I.) |
| --- | --- | --- | --- | --- | --- |
| Example 2 | 0.50 | 100+ | 2H | 2T | No Crack |
| Example 4 | 0.60 | 100+ | H | 2T | No Crack |
| Example 5 | 0.60 | 100+ | 2H | 2T | No Crack |

As can be seen from the above, the properties of coating compositions prepared in accordance with the present invention (i.e., Examples 2 and 4) are very similar to those of the control coating (i.e., Example 5).

Example 7

Coated panels were prepared utilizing the coating compositions from Examples 2, 4, and 5. The panels were prepared in essentially the same manner as set out in Example 6.

Examples 2, 4, and 5 coated aluminum panels were then placed in an ATLAS Ci65 Xenon Arc weatherometer cabinet with the following settings: CAM 180; 0.55 w/m$^2$; irradiance; BP 70° C./ 38° C. light/dark; quartz inner/borosilicate outer filters. The gloss retention and color change data recorded are shown in TABLE 2.

TABLE 2

| Coating | Hours | % Gloss Retention | ΔE Color Change |
| --- | --- | --- | --- |
| Example 2 | 1000 | 83 | 3.71 |
|  | 2000 | 64 | 3.77 |
| Example 4 | 1000 | 81 | 4.62 |
|  | 2000 | 67 | 5.33 |
| Example 5 | 1000 | 83 | 2.60 |
|  | 2000 | 72 | 3.16 |

As can be seen from the above, the properties of coating compositions prepared in accordance with the present invention (i.e., Examples 2 and 4) are very similar to those of the control coating (i.e., Example 5).

It is evident from the foregoing that various modifications, which are apparent to those skilled in the art, can be made to the embodiments of this invention without departing from the spirit or scope thereof. Having thus described the invention, it is claimed as follows.

We claim:

1. A coating composition comprising:
   (a) a polymeric component which comprises a terpolymer which have repeating units of a fluorinated unsaturated monomer, a hydroxy-functional diester of an unsaturated anhydride, and an olefin, and
   (b) a crosslinking component.

2. The coating composition of claim 1 wherein the diester groups of the copolymer are the esterification reaction product of an unsaturated anhydride with an alcohol to form a monoester, followed by the oxyalkylation of the monoester with an epoxy compound whereby an ester is formed with hydroxy functionality.

3. The coating composition of claim 2 wherein the anhydride is selected from the group consisting of maleic anhydride, citraconic anhydride, and alkyl, dialkyl, chloro, and dichloro substitutions thereof.

4. The coating composition of claim 3 wherein the anhydride is selected from the group consisting of maleic anhydride, citraconic anhydride, and mixture thereof.

5. The coating composition of claim 2 wherein the alcohol is selected from the group consisting of $C_1$, to $C_{12}$ acyclic alcohols, cycloalkanols, ether alcohols, and mixture thereof.

6. The coating composition of claim 2 whereon the epoxy compounds is an alkylene oxide.

7. The coating composition of claim 2 wherein the alkylene oxide is propylene oxide.

8. The coating composition of claim 2 wherein the epoxy compound is a glycidyl ether.

9. The coating composition of claim 1 wherein the unsaturated fluorinated monomer is selected from the group consisting of chlorotrifluoroethylene, vinyl fluoride, vinylidene fluoride, and tetrafluoroethylene.

10. The coating composition of claim 9 wherein the olefin is selected from the group consisting of $C_2$ to $C_{12}$ olefins.

11. The coating composition of claim 10 wherein the olefin is a $C_3$ to $C_{10}$ olefin.

12. The coating composition of claim 1 wherein the hydroxy group reactive curing agent is selected from the group consisting of polyisocyanates, aminoplasts, and anhydrides.

13. The coating composition of claim 1 in which pigments have been added.

* * * * *